United States Patent [19]
Patterson et al.

[11] Patent Number: 5,206,969
[45] Date of Patent: May 4, 1993

[54] WIPER WITH REDUCED CHATTER AND WIND LIFT

[75] Inventors: Douglas D. Patterson, Centerville; James E. Roberts, Huber Heights; Scot A. Blommel, Yellow Springs, all of Ohio

[73] Assignee: General Motors Corporation, Detroit, Mich.

[21] Appl. No.: 906,175

[22] Filed: Jun. 29, 1992

[51] Int. Cl.⁵ .............................. B60S 1/04
[52] U.S. Cl. ................. 15/250.42; 15/250.001; 188/378
[58] Field of Search .............. 15/250.001, 250.42, 15/250.35, 250.36, 250.2; 188/378, 379

[56] References Cited

U.S. PATENT DOCUMENTS

| | | | |
|---|---|---|---|
| 3,317,946 | 5/1967 | Anderson | 15/250.42 |
| 4,361,927 | 12/1982 | Matsui et al. | 15/250.42 |
| 4,561,143 | 12/1985 | Beneteau | 15/250.42 |
| 4,590,638 | 5/1986 | Beneteau | 15/250.42 |
| 4,782,547 | 11/1988 | Mohnach | 15/250.04 |
| 5,070,571 | 12/1991 | Arai | 15/250.001 |

FOREIGN PATENT DOCUMENTS

| | | | |
|---|---|---|---|
| 0287464 | 10/1988 | European Pat. Off. | 15/250.35 |
| 0433169 | 6/1991 | European Pat. Off. | 15/250.42 |
| 0459302 | 12/1991 | European Pat. Off. | 15/250.42 |
| 2122678 | 11/1972 | Fed. Rep. of Germany | 15/250.42 |
| 2594765 | 8/1987 | France | 15/250.42 |

Primary Examiner—Harvey C. Hornsby
Assistant Examiner—Gary K. Graham
Attorney, Agent, or Firm—Patrick M. Griffin

[57] ABSTRACT

A specially designed and attached anti-wind lift airfoil also acts to reduce wiper chatter in several ways. The foil is fixed to and runs along side the blade support, bracing and stiffening it. In addition, masses molded inside the foil, plus its own mass, increase the total mass and moment of inertia of the wiper in operation, which acts to counteract the sticking effect. The foil is somewhat resilient, and is fixed to the blade support at widely spaced points, with its center section unsupported. If the blade does stick and slip in operation, undulations are thereby set up in the resilient airfoil, absorbing and damping out the energy that would otherwise show up as chatter.

2 Claims, 2 Drawing Sheets

WIPER WITH REDUCED CHATTER AND WIND LIFT

This invention relates to vehicle windshield wipers in general, and specifically to a wiper with provision for reducing both wind lift and blade chatter.

BACKGROUND OF THE INVENTION

Two problems to which vehicle windshield wipers are inevitably subject are wind lift and blade chatter. Wind lift is caused by the exposure of blade support structures to higher speed air streams at higher vehicle speeds, which can catch and lift the blade away from the windshield. This phenomenon becomes worse as windshields become more raked or slanted. In the absence of an anti-lift air foil or some other external wipe force adjustment mechanism, stronger wiper arm springs are necessary to pull the wiper blade more strongly against the glass. Wiper chatter is caused by friction between the blade and the glass as the blade is swept across the windshield surface. Being rubber, the blade is somewhat tacky, and tends to stick to the surface, and is also elastic, tending to stretch as it sticks. When it has stretched enough to overcome the coefficient of friction, the inventors of the subject invention have found, the blade slips and actually bounces or hop up slightly relative to the windshield, before the stick-slip cycle begins again.

Stick-slip has been mentioned in issued U.S. patents, for example, U.S. Pat. No. 4,361,927 to Matsui et al, although it appears that the phenomenon may have been previously understood as a side-to-side, back-and-fourth motion, generally parallel to the plane of the windshield, It does not appear certain that the up-and-down, windshield bouncing motion was recognized. This is indicated by the proposed solution, which is a dumbbell shaped weight pivoted to the blade tip and designed to rattle back and fourth in the direction parallel to the windshield, colliding with the blade support, in opposition to the perceived back-and-forth chatter of the blade. Elastic linears inboard of the weights are intended to absorb the energy of the collision. It is not at all clear that such a device would have any practical effect in stopping the kind of blade bouncing chatter that has been recently analyzed. Moreover, the pivoting mass would be very subject to clogging with dirt, ice, and snow, and would very likely whistle due to exposure to the air stream.

Various air-foil designs exist for counteracting wind lift. These generally consist of an air-foil shaped member attached to the wiper arm and exposed to the air stream. The air-foil shape is oriented so as to push down on the arm at higher speeds. These designs are, of course, not directed at blade chatter.

SUMMARY OF THE INVENTION

The invention provides a unique design which serves both as mass damper unit to reduce chatter and as an anti-wind lift airfoil, all in a simple but highly effective structure.

In the preferred embodiment disclosed, the invention is used with a standard wiper, to which it can be readily retrofitted. The wiper includes a wiper arm that is swung about a wiper shaft pivot point by a standard motor, and which is spring loaded toward the windshield to apply wiping force. The wiper blade is supported by a superstructure pinned to the end of the wiper arm. The blade support is the type that has an array of interconnected yokes that act to distribute the pressure from the wiper arm more evenly to the blade.

The combined anti-lift and chatter reduction device of the invention includes an airfoil molded from a partially resilient material, such as polyurethane, which is also fairly massive, and which runs most of the length of the blade, from tip to heel. The cross sectional shape of the foil is generally elliptical, making it more stiff in the direction parallel to the windshield, and more flexible in the direction perpendicular to the windshield. Molded internally into the airfoil, near each and, are a pair of separate, concentrated masses. The airfoil is fixed to the blade support, independent of the arm, by a pair of widely spaced, discrete fixture points in the form of claws, one near each end. The claws are snapped firmly to the blade support, leaving the majority of the center of the foil unsupported.

In operation, the airfoil provides downward pressure at high speeds. During wipe conditions hen chatter is most likely, the added mass of both the airfoil and the separate masses, by increasing kinetic energy, opposes the tendency of the blade to stick. The location of the separate masses, being distant from the wiper pivot, are additionally effective in increasing the moment of inertia of the wiper, which also opposes blade sticking. When stick-slip does occur, the energy produced by the hopping up of the blade is absorbed and damped out by the airfoil, the unsupported center section of which can undulate slightly, given its resilient and out-of-plane flexibility. In addition, the airfoil adds stiffness to the blade support, which also helps to reduce the effect of chatter. The separate masses, being entirely encapsulated, have no negative visual or noise effect.

DESCRIPTION OF THE PREFERRED EMBODIMENT

These and other objects and features of the invention will appear from the following written description, and from the drawings, in which.

Figure 1:
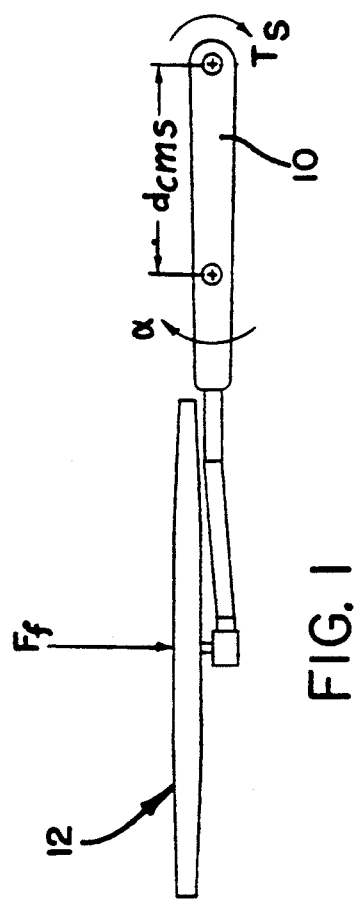
FIG. 1 is a diagrammatic representation of a wiper and the friction forces acting on it.

Referring first to FIG. 1, a typical wiper consists of a wiper arm (10), which is swept back and forth about a pivot point by a wiper motor, not illustrated, and a blade support, indicated generally at (12). Wiper arm (10) is pinned at its end to the approximate center of blade support (12). The wiper motor applies a torque about the pivot point, indicated at $T_s$, which gives the wiper arm (10) a certain angular velocity $a$. Friction from the windshield creates a retarding force $F_f$ that acts in opposition to the motor. For any given angular velocity, the inventors have found, the greater the kinetic energy and moment of inertia of the wiper, and the more easily the opposing frictional force can be overcome. The moment of inertia, relative to the pivot point, is greater if the center of mass of the wiper, indicated at $d_{cms}$, is farther from the pivot point.

Figure 2:
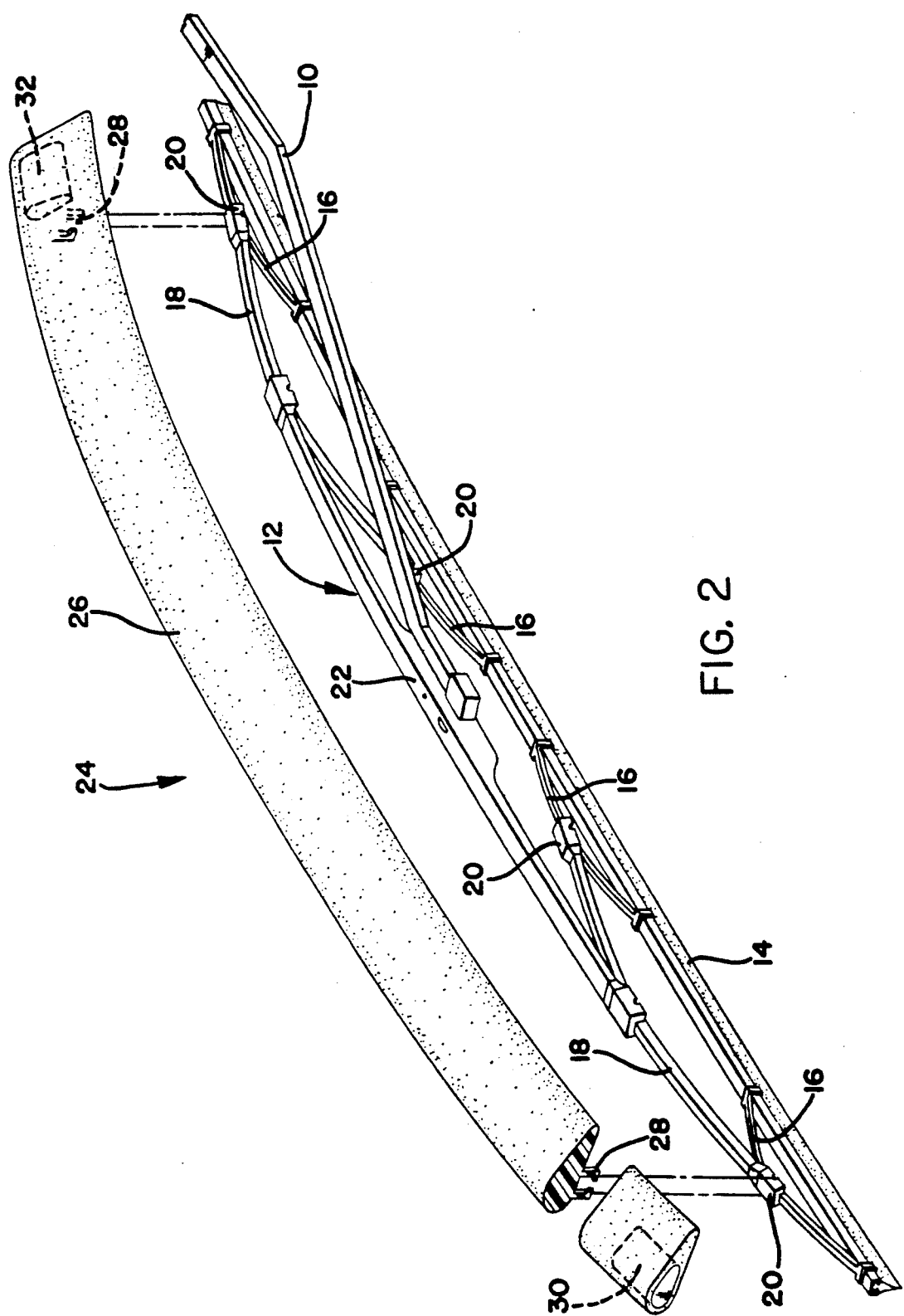
FIG. 2 is a perspective view of a conventional wiper arm, blade support and blade with a preferred embodiment of the invention shown above.

Referring next to FIG. 2, additional detail of blade support (12) is illustrated. Wiper arm (10) is spring loaded downwardly, toward the windshield, which supplies the necessary wiping force. Four tertiary yokes (16) directly hold blade (14). Two secondary yokes (18) hold the centers of the tertiary yokes (16) with pivots (20) that allow a limited rocking motion. Similarly, a primary yoke (22), the center of which is pinned to wiper arm (10), holds the centers of the two secondary yokes (18). The net effect of this array of progressively smaller yokes, as compared to a simpler blade support with fewer pieces, is that the wiping force from arm (10) is more evenly distributed to blade (14). Still, it is inevitable that the wiping force would be more strongly distributed to the two inboard tertiary yokes (16) than to the two outboard ones, since they are closer to the end of the wiper arm (10). Blade (14) is able to more closely conform to any curvatures in the windshield, because of the interconnecting pivots like (20). However, any slop or looseness in the rocking pivots also reduces the side-to-side stiffness of the support structure, which amplifies the effect of the kind of stick-slip blade chatter described above. Furthermore, there are more parts and surfaces presented to the high speed air stream, which can increase wind lift. Still, structures like blade support (12) are increasingly seen in production. The invention may be easily adapted to such structures, and deals with both the chatter and wind lift problems.

Figure 3:
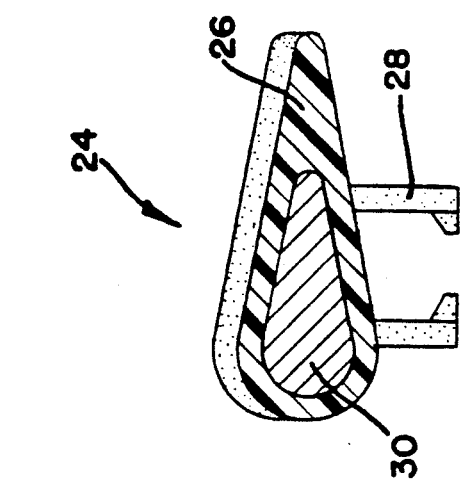
FIG. 3 is a cross section of the invention.
Figure 4:
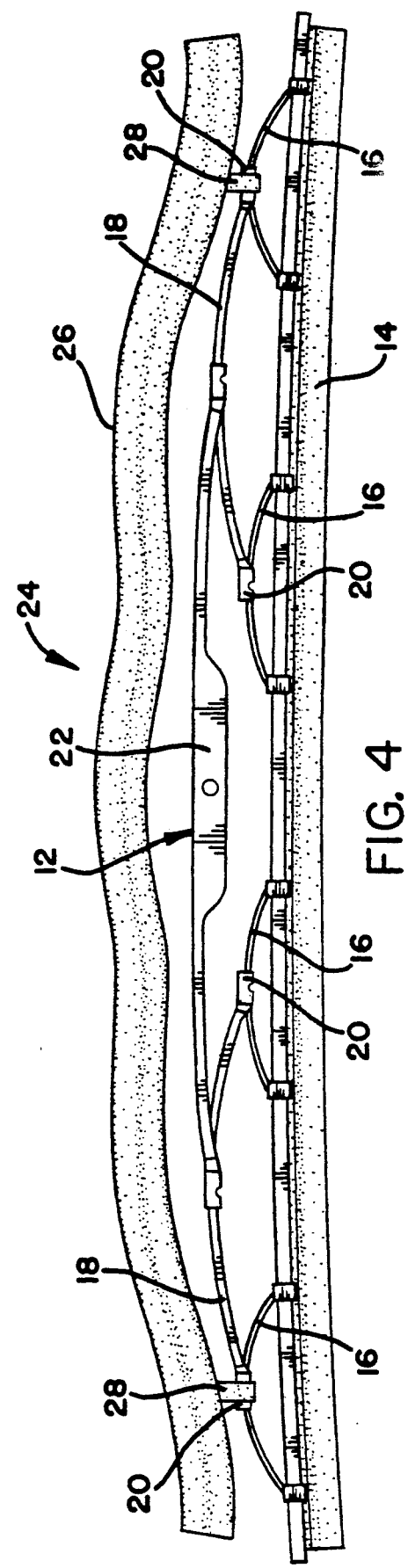
FIG. 4 is a side view of a wiper blade with the invention attached, showing an exaggerated view of its response to blade chatter.

Referring next to FIGS. 2 and 3, a preferred embodiment of the combined anti-wind lift airfoil and chatter suppression damper of the invention is indicated generally at (24). The basic component of the invention is an airfoil (26), and the invention appears visually to be no more than that. Airfoil (26) is molded of a partially resilient material, such as polyurethane, which is tough and durable, and is also fairly massive in its own right, but which has enough flexibility to rebound slightly if disturbed. Thus, the term "partially resilient may be read to mean a material, like polyurethane, which is both massive and flexible enough, and supported in such a way, that it is capable of setting up undulations when disturbed. It has an elliptical cross section, as best seen in FIG. 3, and so is significantly stiffer in plane, that is, generally parallel to the windshield, than it is out of plane, that is, in a direction generally normal to the windshield. Airfoil (26) is substantially as long as blade (14), and has two pairs of gripping claws (28) located so as to engage and tightly grip the two outboard rocking pivots (20). Molded integrally into airfoil (26) are a pair of separate, concentrated masses, a tip mass (30) and heel mass (32), located near and just outboard of the claws (28). Each consists of a dense metal, such as lead or brass, with tip mass (30) being approximately 35-40 grams and heel mass (32) approximately 7-9 grams.

Referring next to FIGS. 2 and 3, the installation and operation of the invention is illustrated. When installed, airfoil (26) extends nearly from the tip to heel of blade (14), resting above and parallel to primary yoke (2), but not touching arm (10). It is supported near its ends, but not over its center section. The attitude or orientation of its elliptical cross section is such that, at high speeds, downward force would be applied to blade (14), counteracting up lift. An anti-lift device can reduce blade friction and the resultant chatter just by the fact that less spring force would be necessary on wiper arm (10) to counteract wind lift, decreasing frictional drag on blade (14) at lower air speeds. In addition, several unique features of airfoil (26) and the way it is attached act alone, and in cooperation with blade support (12), to counteract and reduce chatter. First, there are structural effects. The airfoil (26) acts as a structural brace, stiffening the entire blade support (12), which reduces the effect that the retarding frictional force can have on the various elements of the blade support (12). In addition, the weight of the airfoil (26), acting through the two claws (28), and the two concentrated masses (30) and (32), since they are located over and near the outboard tertiary yokes (16), apply weight and additional wiping force at the tip and heel of blade (14), giving a more uniform overall wiping force. Secondly, there are dynamic effects. The added mass, both from the relatively heavy polyurethane material and the masses (30) and (32), increases the net kinetic energy of the wiper as it rotates. This is because the drive motor is strong enough to keep the wiper arm (10) moving at substantially the same speed, despite the added mass. Consequently, the extra kinetic energy is better able to fight and overcome the friction force holding blade (14) back. In addition, the weighting of the extra mass toward the tip, by virtue of the greater mass and outboard location of tip mass (30), increases the effective moment of inertia more than just a uniform weighting would. It has also been found that chatter tends to have more effect at the tip and heel of blade (14), so providing extra mass concentrated near those two points is more effective.

Referring to FIG. 2, there is also a combined structural and dynamic effect unique to the disclosed design that act to reduce the noticeable effect of whatever stick-slip chatter is not counteracted in the first instance. As described above, the inventors have found that the slipping rebound of the sticking blade (14) causes the blade support (12) to hop slightly up, away from the windshield, and fall back. As it falls back, the unsupported weight of the center section of the partially resilient airfoil (26), between the widely spaced, upstanding claws (28), tends itself to bounce, setting up undulations. Not being jointed to the wiper arm (10) directly, the airfoil (26) is not restricted in that regard. The undulations are exaggerated in the drawing, of course, and would unlikely be noticeable. The energy that would otherwise show up as chatter is damped out, being released as heat to the air stream over the airfoil (26) as the undulations settle out. The elliptical shape of the airfoil (26), wide in the in-plane direction, but thin in the out-of-plane direction, combined with its unsupported center weight and resilience, therefore provides a mass-damper unit as well as an anti-lift device.

In conclusion, a very simple looking device with very few parts provided a surprising number of advantages and features, including lift suppression, structural stiffening, more uniform wiping force distribution, added kinetic energy to fight sticking, and damping out of any stick-slip that does occur. There are no visual or noise disadvantages. Variations in the disclosed embodiment could be made. It could be an integral part of the wiper and blade support (12), fixed integrally to the outboard pivots (20). However, a real advantage of the embodiment disclosed, with the gripping claws (28), is that it can be easily retrofitted to an existing blade support like (12). The separate masses (30) and (32) can be easily changed, both in terms of size and position along the length of airfoil (26), so as to put extra mass and weight at the most advantageous locations. Even with no separate masses molded inside airfoil (26), its own extra mass, and its internal, inherent damping characteristics, will reduce stick-slip and tend to cancel out whatever blade chatter remains. Therefore, it will be understood that it is not intended to limit the invention to just the embodiment disclosed.

The embodiments of the invention in which an exclusive property or privilege is claimed are defined as follows:

1. In a vehicle windshield wiper of the type having a wiper blade support carried by a wiper arm that swings about a pivot point at a predetermined velocity and supporting a wiper blade that engages said windshield with sufficient drag to tend to cause blade chatter, and in which said blade support is exposed to a high speed air stream tending to cause said blade to lift away from said windshield, the improvement comprising, an airfoil on said wiper blade support oriented to said air stream so as to apply a downward lift suppressing force, said airfoil being formed from a material that is sufficiently resilient and massive to undulate under the influence of the blade chatter and which is fixed to and above said blade support independently of said wiper arm at widely spaced, discrete fixture points so as to extend parallel to a substantial portion of said blade, whereby, the total mass and stiffness of said wiper blade support is increased by the addition of said airfoil, reducing chatter, while remaining chatter is damped out by undulations set up between said widely spaced fixture points.

2. In a vehicle windshield wiper of the type having a wiper blade support carried by a wiper arm that swings about a pivot point at a predetermined velocity and supporting a wiper blade that engages said windshield with sufficient drag to tend to cause blade chatter, and in which said blade support is exposed to a high speed air stream tending to cause said blade to lift away from said windshield, the improvement comprising, an airfoil on said wiper blade support oriented to said air stream so as to apply a downward, lift suppressing force, said airfoil being formed from a material that is sufficiently resilient and massive to undulate under the influence of blade chatter and which is fixed to and above said blade support independently of said wiper arm at widely spaced, discrete fixture points so as to extend parallel to a substantial portion of said blade, and, at least one separate, concentrated mass located internal to said airfoil, and free from exposure to said air stream, said separate mass also being located substantially distant from said pivot point, whereby, the total mass and stiffness of said wiper blade support is increased by the addition of said airfoil and the moment of inertia of said wiper relative to said pivot point is increased by said separate mass, reducing chatter, while remaining chatter is damped out by undulations in said airfoil set up between said widely spaced fixture points.

* * * * *